July 27, 1943.　　F. O. H. CHUTJIAN　　2,325,370
PROCESS OF TREATING TEA
Filed Feb. 5, 1942
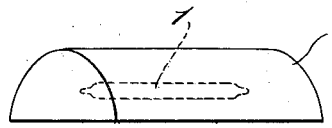
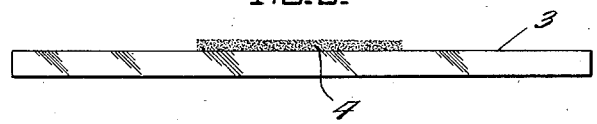
INVENTOR.
Fanet O. H. Chutjian
BY
ATTORNEYS Patented July 27, 1943

2,325,370

UNITED STATES PATENT OFFICE 2,325,370

PROCESS OF TREATING TEA

Fanet O. H. Chutjian, New York, N. Y.

Application February 5, 1942, Serial No. 429,599

2 Claims. (Cl. 99—76)

This invention relates to a process of treating tea to improve the qualities thereof.

Tea contains a substantial proportion of substances which may be classified under or identified by the term "tannin," this being a generic name given to the naturally occuring derivatives of polyhydroxy benzoic acids used for converting skins into leather. One of the most important of these is gallotannic which is believed to be a glucoside of digallic acid. Tannin is concentrated in the water soluble extract of tea, the percent of tannin therein varying depending on the source and species and numerous other variables. The use of considerable amounts of tea as a beverage has a tendency to lead to certain pathological conditions such as constipation and indigestion due to the effect of the tannin in coagulating proteins in the small intestines and diminishing the normal secretions therein by the astringent effect of the tannin.

Various attempts have been made to reduce the tannin content in tea. For example, tea infusions have been treated with agents intended to precipitate the tannin, for example gelatin and casein, a form of milk or skim milk. These methods have been unsatisfactory for various reasons. Obviously the result of these treatments is to produce not the normal tea product in the leaf form which is desired by consumers but rather an infusion thereof which is not well received by the public either as such or after evaporation. Moreover, such treatment substantially alters the taste, flavor, etc.

It is an object of the present invention to reduce the tannin content of tea without in any way affecting the other normal characteristics. It has been discovered that this object can be achieved by irradiating the tea with ultra-violet light. It has also been found that the quality of the tea is thereby further improved by preventing the growth of and destroying yeasts, molds and bacteria. The product is therefore important from the hygienic point of view as well as in its physiological effects.

The principles of the invention will be defined in the claims and will be illustrated by the following specific illustrative examples taken in conjunction with the accompanying drawing in which there is shown diagrammatically an apparatus embodying the apparatus features of the invention and illustrating an apparatus suitable for the practice of the process of the invention, and in which Fig. 1 shows a source of ultra-violet light and Fig. 2 a mass of tea leaves on a support.

The source of ultra-violet radiation is the tube 1 provided with a reflector 2. This tube may be a conventional quartz high-pressure mercury vapor discharge tube having an energy consumption of 570 watts and operating at 140 volts and 4.5 amperes. Located at a distance of about eight inches below the tube is a support 3 which may be made of glass or other suitable inert material.

In practicing the method of the invention, the tea 4 may be spread out on the support 3 to a thickness of about one-eighth to one-quarter of an inch in an area of about one square foot, immediately below the tube 1 and exposed to the ultra-violet radiation from the lamp for varying periods. For example, if the thickness of the tea is one-quarter of an inch the exposure may be from one to five minutes; if the thickness of the tea layer is one-eighth of an inch the exposure may be from one to one and one-half minutes. In one series of tests the thickness of the tea was one-quarter of an inch and upon five minutes exposure in the manner explained, analysis showed a reduction in the tannin content of about 20 percent as compared with the tea prior to the said treatment. The time of exposure may be varied in relation to the thickness of the tea layer and the intensity of the source of radiation to secure the desired reduction in tannin content. The reduction in tannin content increases, for a radiation of given intensity, as the time of exposure increases. For example, exposure of tea in a layer of one-quarter of an inch thickness for only 10 seconds, under the conditions described above, reduced the tannin content of an untreated sample from 11.26 percent to 9.84 percent. Continuing the exposure to a time of 45 seconds brought the tannin down to 9.63 percent, and further reduction was obtained on longer exposure.

Instead of exposing successive batches of tea for predetermined periods, the tea may be continuously processed by continuously passing it on a conveyor belt through an exposure zone and controlling the speed of the belt to get the necessary time of exposure, and also controlling the area of exposure in relation to the intensity of the lamp, as above set forth. The conveyor belt may be made of glass fibers so as to provide the substantial equivalent of the stationary platform as far as the supporting function is concerned.

The quartz tube may be provided with a filter to separate the infrared rays so as to avoid unduly heating the tea and thereby detracting from its desirable normal characteristics of flavor, aroma, etc.

It has been found that the described treatment has the efficacy of effecting the desired reduction in tannin content without in any way impairing the otherwise normal and desired characteristics of the tea such as appearance, flavor, aroma, etc., and that the invention therefore makes it possible to market an improved tea having all normal characteristics and, in addition, an improved quality due to the reduction in tannin content.

What is claimed is:

1. The process of treating tea which comprises exposing a mass of tea leaves to the action of ultra-violet light and thereby effecting a reduction in the tannin content of said tea without substantially affecting the other normal characteristics of the tea.

2. The process which comprises irradiating a mass of tea leaves in the form of a shallow layer thereof with ultra-violet light and thereby reducing the tannin content of said tea.

FANET O. H. CHUTJIAN.